United States Patent [19]
Baker et al.

[11] Patent Number: 5,621,795
[45] Date of Patent: Apr. 15, 1997

[54] SYSTEM AND METHOD FOR FAULT TOLERANT KEY MANAGEMENT

[75] Inventors: Walter J. Baker, Stratford; Feliks Bator, Easton; Chunhua Li, North Haven, all of Conn.

[73] Assignee: Pitney Bowes Inc., Stamford, Conn.

[21] Appl. No.: 364,323

[22] Filed: Dec. 27, 1994

[51] Int. Cl.⁶ ........................................................ H04L 9/00
[52] U.S. Cl. ................................. 380/21; 380/48; 380/49
[58] Field of Search .................................. 380/2, 21, 48, 380/49

[56] References Cited

U.S. PATENT DOCUMENTS 5,214,698  5/1993  Smith, Sr. et al. ........................ 380/21

*Primary Examiner*—Bernarr E. Gregory
*Attorney, Agent, or Firm*—Charles R. Malandra, Jr.; Melvin J. Scolnick

[57] ABSTRACT

A system and method of fault tolerant key management of cryptographic keys includes a key distribution computer and primary and secondary key management computers coupled to the key distribution computer, Primary and secondary server computers are each coupled to the primary and secondary key management computers, One of the primary and secondary key management computers is operational at a time, The operational one of the primary and secondary key management computers writes key data received from the key distribution computer to an archive database in each of the primary and secondary server computers, The method includes the steps of requesting storage of key data by an operational one of the primary and secondary key management computers; monitoring the operational status of each of primary and secondary server computers; writing key data to an archive database in each of the primary and secondary servers that are operational; writing key data to a log file in an operational one of the primary and secondary servers when one of the primary and secondary servers is not operational; monitoring a return to operational status of the non operational one of the primary and secondary servers; and writing to the archive database of the non-operational one of the primary and secondary server computers the key data stored in the log file of the operational one of the primary and secondary server computers.

9 Claims, 4 Drawing Sheets

SYSTEM AND METHOD FOR FAULT TOLERANT KEY MANAGEMENT

FIELD OF THE INVENTION

The present invention relates generally to system and method for cryptographic key management and, more particularly, to a fault tolerant key management system and method.

BACKGROUND OF THE INVENTION

In a cryptographic key management system, the reliability of the system to maintain keys distributed to a plurality of end users is critical.

Conventional fault tolerant systems, such as used in banks, in which database decisions typically occur in redundant servers where the data is being stored. Thus, when a server goes down the decision to log information cannot be made unless a third server is linked to the other two servers. With only two servers in a conventional fault tolerant system, manual intervention must take place when a down server returns to an operational state. Such manual intervention occurs in other than real time processing. Such conventional systems do not include a client that establishes and maintains logs of transactions when one of the servers is down and which can resynchronize the servers in real time. Such conventional systems merely roll back the transactions and post them later. Typically, resynchronization occurs in other than real time processing.

SUMMARY OF THE INVENTION

In accordance with the present invention a fault-tolerance strategy is applied to a key management system that is structured as a Client-Server distributed system. The key management system is often referred to herein as "KMS". The present invention provides a low cost system and method which is application driven to ensure data integrity and availability on a real-time basis for the key management system. The present invention includes redundant client computers and server computers, each of which is operational at a different physical location from the others. The two servers backup each other in accordance with the application driven by the working one of the client computers. The KMS working client does the transaction on both local server, i.e., local to the working client, and the remote server. If one of the servers is not available, the working client will do the transaction on the surviving server, and also record the transaction into a log table on the surviving server. When the failed server becomes available again, the working client will resynchronize two servers based on the information in the log table.

The fault-tolerance and recovery scheme of the present invention provides KMS data integrity and availability in real time. It has been found that such a real time fault tolerant system can be achieved by removing database decisions from the servers in which the database is stored and putting such decisions in application processing client computers. In such an arrangement, a less number of servers are needed to achieve fault tolerance.

In accordance with the present invention a method of fault tolerant key management of cryptographic keys includes the steps of requesting storage of key data by an operational one of the primary and secondary key management computers; monitoring the operational status of each of primary and secondary server computers; writing key data to an archive database in each of the primary and secondary servers that are operational; writing key data to a log file in an operational one of the primary and secondary servers when one of the primary and secondary servers is not operational; monitoring a return to operational status of the non operational one of the primary and secondary servers; and writing to the archive database of the non-operational one of the primary and secondary server computers the key data stored in the log file of the operational one of the primary and secondary server computers.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
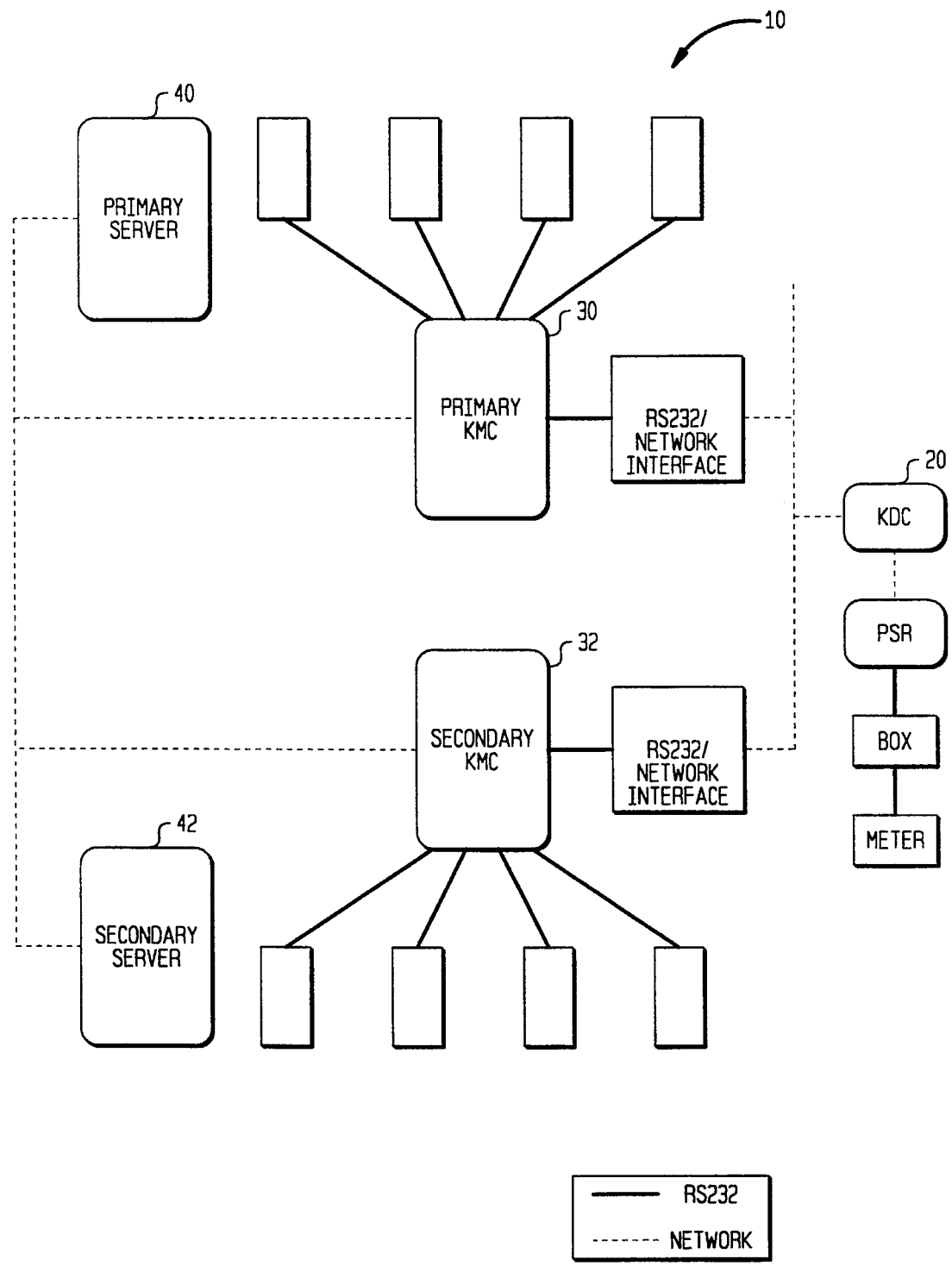
FIG. 1 is a block diagram of a key management system in accordance with the present invention.

In describing the present invention, reference is made to the drawings, wherein there is seen in FIG. 1 a block diagram of a fault tolerant key management system, generally designated 10, in accordance with the present invention. KMS 10 includes a key distribution computer 20 that is coupled to primary and secondary key management computers 30 and 32 and to primary and secondary servers 40 and 42. The primary key management computer remains on-line and communicates with both primary and secondary servers 40 and 42 by network communications.

The following assumptions form a basis for the present invention: 1) an operator will be available when needed for manual operation; 2) when resynchronization between two servers 40 and 42 is needed, the key management system 10 will suspend its operation; 3) key management computers 30 and 32 do not have any database stored therein; and 4) a transaction is incomplete when neither server is available.

During normal operation, the secondary key management computer 32 remains in warm standby while the primary key management computer 30 is functional. Primary key management computer 30 runs client application control algorithms and stores transactions on both primary server 40 and secondary server 42. However, data is retrieved only from primary server 40.

When secondary server 42 is down, the storage of transactions in secondary server 42 by primary key management computer 30 can not be completed. Primary key management computer 30 logs all transactions to primary server 40 while secondary server 42 is down. When secondary server 42 returns on-line, primary key management computer 30 suspends its normal key generation or verification while it resynchronizes secondary server 42 with primary server 40.

If resynchronization cannot continue due to a fault, such as with primary server 40 or the network link, primary key management computer 30 operation may stop until the fault is corrected.

If resynchronization cannot continue due to a primary key management computer 30 fault, secondary key management computer 32 goes on-line and takes over the resynchronization and then continues the key management operation.

If primary key management computer 30 goes down while secondary server 42 is down and primary key management computer 30 has been logging on primary server 40, the key management operation and logging function switches over to secondary key management computer 32. Secondary key management computer 32 updates primary server 40 and logs all transactions on primary server 40. When secondary server 42 is back, secondary key management computer 32 initiates the resynchronization of secondary server 42. If for some reason secondary key management computer 32 cannot take over then the key generation or verification operation stops.

When primary server 40 is down, the storage of transactions to primary server 40 can not be completed. Primary key management computer 30 logs all transactions to secondary server 42 while primary server 40 is down. Now, all the data retrieval is done from secondary server 42. When primary server 40 is back, primary key management computer 30 suspends its key generation or verification and resynchronizes primary server 40 with secondary server 42.

If resynchronization cannot continue due to a fault, primary key management computer 30 operation may stop until fault is recovered. If resynchronization cannot continue due to primary key management computer 30 fault, secondary key management computer 32 takes over the resynchronization and continues operation.

While primary server 40 is down and primary key management computer 30 is logging on secondary server 42, primary key management computer 30 goes down. The operation switches over to secondary key management computer 32 which updates secondary server 42 and logs all transactions on secondary server 42. When primary server 40 comes back on-line, secondary key management computer 32 will do the resynchronization.

If primary key management computer 30 cannot communicate with either primary server 40 or secondary server 42, the operation is switched over to secondary key management computer 32. Secondary key management computer 32 updates secondary server 42 and logs all transaction on secondary server 42. After communication is restored, secondary key management computer 32 initiates the resynchronization.

While KMS is under normal operation, primary key management computer 30 goes down. Secondary key management computer 32 takes over by retrieving data from secondary server 42 and updates data to both servers. Because of the symmetric configuration, all the faults and operation procedures will be same as described above.

Figure 2:
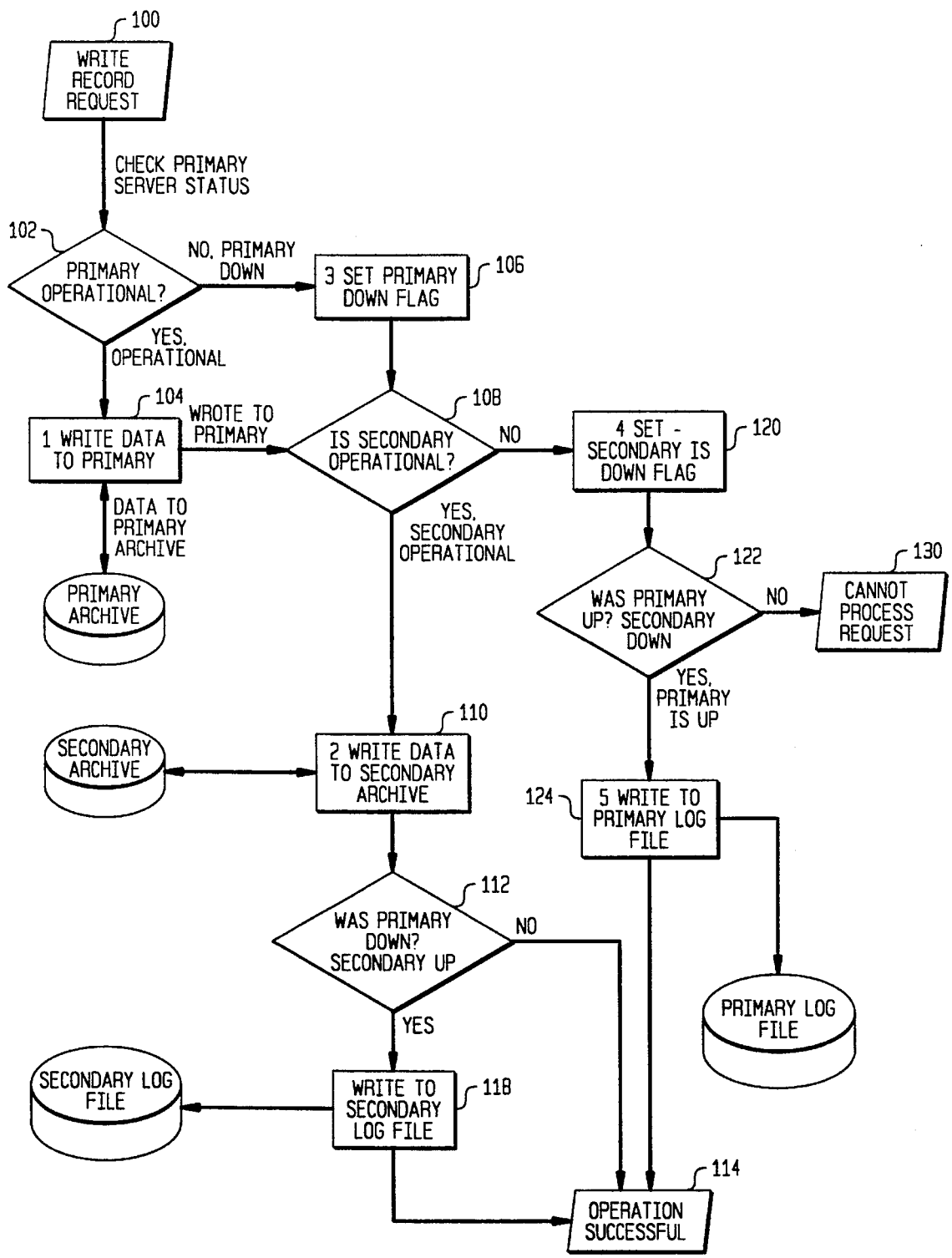
FIG. 2 is a process flow chart of replication by the key management computers.

Referring now to FIG. 2, a flow chart for a key management computer 30 or 32, also referred to herein as a client, replication process shows the operations that take place when data is being written to a database in the servers 40 and 42. The following paragraphs describe the different paths of the process depending on the status of servers 40 and 42.

1. Primary and Secondary Servers Operational

At 100, a write record request is received from key management computer 30 to store a key into the database in servers 40 and 42. At 102, a determination is made whether primary server 40 is operational. If operational, at 104 the key data is written to the primary server archive. After the data is written, at 108 a determination is made whether secondary server 42 is operational. If operational, at 110 the same key data is written to the secondary server archive. After the data is written to the secondary server archive, at 112 a check is made to see whether or not primary is down. In the process flow described in this paragraph this is not the case, so at 114 the operation is successfully completed. When both servers are operational, the archive in each of primary and secondary servers 40 and 42 are identical.

2. Primary Server Down, Secondary Server Operational

If the primary server 40 is determined to be down at 102, data could not be written to the primary server and at 106 a flag is set indicating primary server 40 is down. At 108 a determination is made whether secondary server 42 is operational. If operational, at 110 the same key data is written to the secondary server archive. After the data is written to the secondary server archive, at 112 a check is made to see whether or not primary server 40 is down. Since primary server is down, at 118 the key data is written to a log file in secondary server 42, and at 114 the operation is successfully completed. Log files are only created and maintained on a server only when the other server is down.

3. Primary Server Operational, Secondary Server Down

At 102, a determination is made whether primary server 40 is operational. If operational, at 104 the key data is written to the primary server archive. After the data is written, at 108 a determination is made whether secondary server 42 is operational. If the secondary server 42 is determined to be down at 108, data could not be written to the secondary server and at 120 a flag is set indicating secondary server 40 is down. At 122 a determination is made whether or not primary server 40 is operational and secondary server is down. Since primary server is up, at 124 the key data is written to a log file in primary server 42, and at 114 the operation is successfully completed.

If the primary server 40 is determined to be down at 102, data could not be written to the primary server and at 106 a flag is set indicating primary server 40 is down. At 108 a determination is made whether secondary server 42 is operational. If the secondary server 42 is determined to be down at 108, data could not be written to the secondary server and at 120 a flag is set indicating secondary server 40 is down. At 122 a determination is made whether or not primary server 40 is operational and secondary server is down. Since both servers are down, at 130 the write request initiated by the Key Management computer 30 at 100 cannot be processed.

In accordance with the present invention, a client, i.e. key management computer, makes database decisions such as writing to the server archive and logging to the server log file. If the primary client is down, the secondary client takes over without missing a beat. The operational client maintains a log on an operational one of the servers when the other server is down such that when both servers are back on-line the process can resynchronize the data in the archives of the servers in real time so that the archives are identical once again.

This is different from conventional fault tolerant systems, such as used in banks, in which database decisions typically occur in redundant servers where the data is being stored. Thus, when a server goes down the decision to log cannot be made unless a third server is linked to the other two servers. With only two servers in a conventional fault tolerant system, manual intervention must take place when a down server returns to an operational state. Such manual intervention occurs in other than real time processing. Such conventional systems do not include a client that establishes and maintains logs of transactions when one of the servers is down and which can resynchronize the servers in real time. Such conventional systems merely roll back the transactions and post them later.

In the present invention one of the clients 30 and 32 is responsible for determining whether or not data was successfully written to both primary and secondary servers 40 and 42. In the event that data was not successfully written to one of the servers, the client maintains a log file that keep track of data that was not written to the inoperable server.

In accordance with the present invention, even when the primary client goes down the secondary client comes on-line and reads the log file from the server that was up and then resynchronizes the system based on the data written to the log. The fault tolerant system of the present invention is needed because key data that is being written to the servers is also stored in the key distribution computer 20. Unless the data stored to the servers is synchronized with the data stored in the key distribution computer 20, the system fails. If conventional fault tolerant systems were used in such a key management system, a total of four servers would be required.

Figure 3:
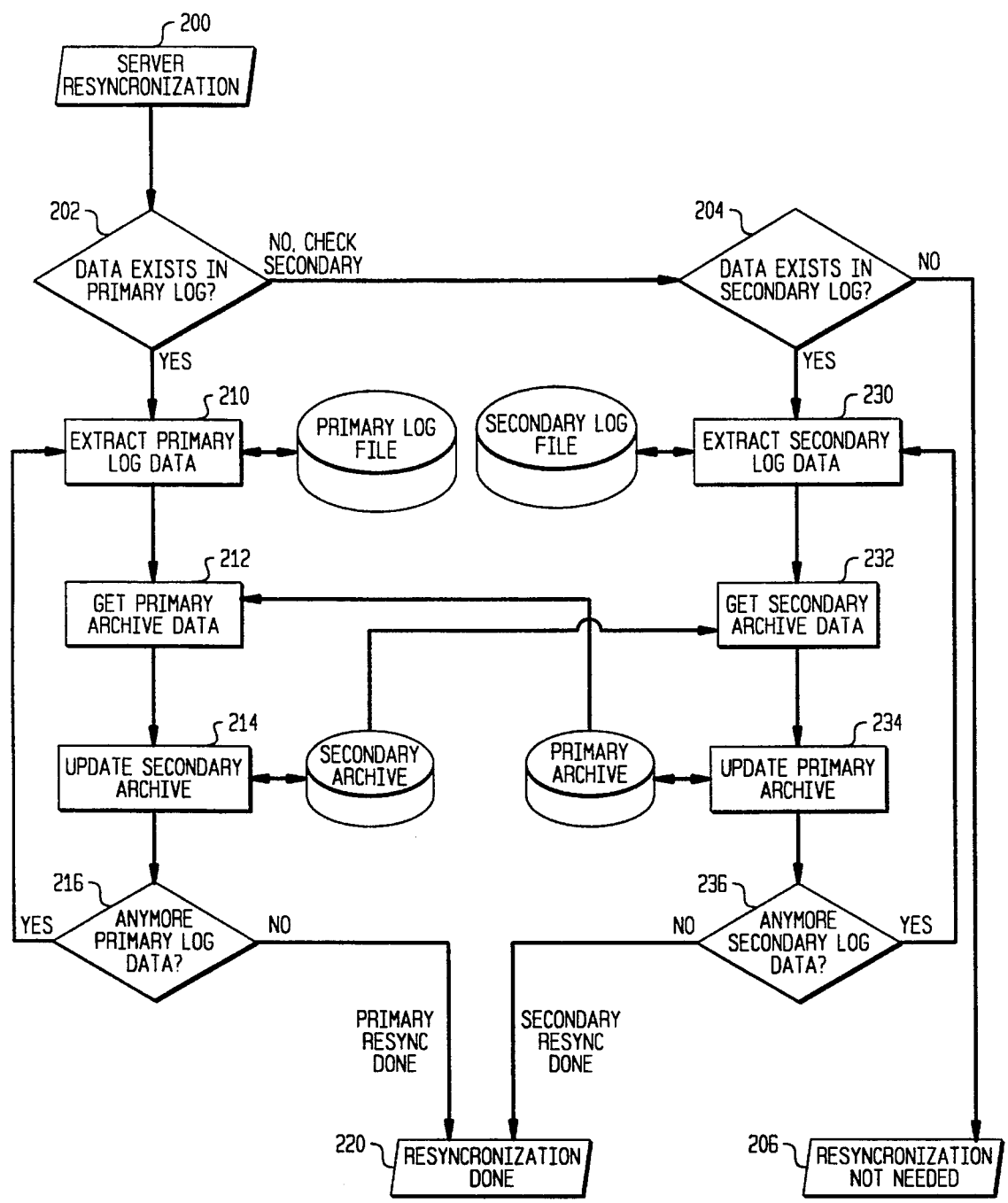
FIG. 3 is a process flow chart of resynchronization by the key management computers.

Referring now to FIG. 3, a flow chart for a client based server resynchronizing process is the process of recovering data that was not written to one of the servers.

At 200, server resynchronization is initiated in the operational one of primary or secondary client 30 or 32. At 202 a client application determines whether data exists in a log contained in the primary server 40. If not, at 204 it determines if a log exists on secondary server 42, and if not the resynchronization is not needed at 206. In the event that data does exist in the log of primary server 40, the data from the primary log file is read at 210, and a database index reflecting an archive record stored to the primary archive is extracted. At 212 data from the primary archive file is obtained and using the database index from the log file a determination is made as to which operations were being done at the time the secondary server went down. The secondary archive is then updated at 214 with the appropriate record corresponding to the database index extracted from the primary log file. At 216 a determination is made if additional log data exists. If more log data exists, at 210 such additional data is read from the primary Log file. If not, at 220 the resynchronization is done.

If data exists in the secondary log at 204, the data from the secondary log file is read at 230, and a database index reflecting an archive record stored to the secondary archive is extracted. At 232 data from the secondary archive file is obtained and using the database index from the log file a determination is made as to which operations were being done at the time the primary server went down. The primary archive is then updated at 234 with the appropriate record corresponding to the database index extracted from the secondary log file. At 236 a determination is made if additional log data exists. If more log data exists, at 230 such additional data is read from the secondary log file. If not, at 220 the resynchronization is done.

The resynchronization process occurs during normal client, i.e. key management computer, operation where the client is attempting to write data to one of the servers and all of sudden it detects that both servers are up. Then the client automatically starts the resynchronization process.

If an incomplete transaction occurs during the key generation operation, key distribution computer 20 will request another key. If an incomplete transaction occurs during the key installation verification, key distribution computer 20 will send the record for verification again. If the incomplete transaction is due to primary key management computer 30 fault or a communication fault, key distribution computer 20 will be informed of the fault. Key distribution computer 20 will send another request to secondary key management computer 32.

If an incomplete transaction occurs during the token verification the verification operation will suspend.

Figure 4:
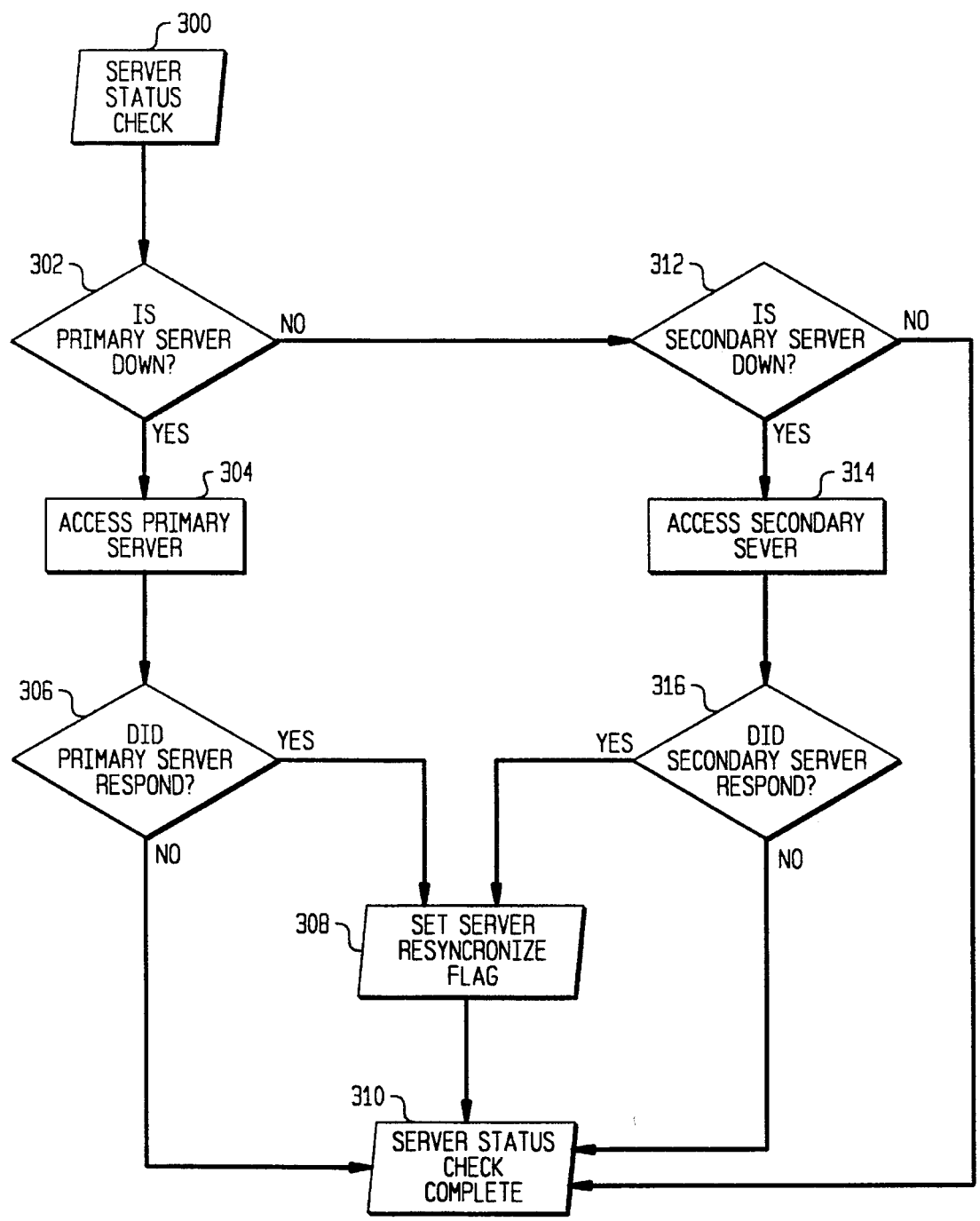
FIG. 4 is a flow chart of the key management computer monitoring the status of the servers.

Referring now to FIG. 4, a server status monitor process is shown which determines if operation has been restored to a server that was previously identified as being inoperable. At 300 the server status check is initiated by the key distribution computer 20. At 302 a determination is made whether primary server 40 is down. If down, an attempt is made to access the primary server at 304. If the primary server responds at 306, then a server resynchronization flag is set which will cause the resynchronization shown in FIG. 3. Then the server status check for this pass is completed at 310. If the primary server does not respond at 306 the server status check for this pass is completed at 310.

If the primary server has not been down at 302, then at 312 a determination is made whether secondary server 42 is down. If down, an attempt is made to access the secondary server at 314. If the secondary server responds at 316, then a server resynchronization flag is set which will cause the resynchronization shown in FIG. 3. Then the server status check for this pass is completed at 310. If the secondary server does not respond at 316 the server status check for this pass is completed at 310.

It will be understood by those skilled in the art that the present invention is not limited to two client computers and two server computers. Additional client and server computers can be used in the present invention. The foregoing description is for the preferred embodiment.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A key distribution system for generating and maintaining cryptographic keys comprising:

a key distribution computer;

a primary key management computer operatively coupled to said key distribution computer by a first interface;

a secondary key management computer Operatively coupled to said key distribution computer by a second interface, said second interface being parallel to said first interface;

a primary server computer operatively coupled to said primary and secondary key management computers; and a secondary server computer operatively coupled to said primary and secondary key management computers;

wherein one of said primary and secondary key management computers is operating on-line at a time, said operating one of said primary and secondary key management computers including means for writing key data received from said key distribution computer to an archive database in each of said primary and secondary server computers.

2. The key management system of claim 1 wherein said operating one of said primary and secondary key management computers includes replication means that verify that said primary and secondary server computers are respectively operating before writing said key data to said archive database in each of said primary and secondary server computers.

3. The key management system of claim 2 wherein said operating one of said primary and secondary key management computers writes said key data to a secondary server computer log file when said primary server computer is not operating and said secondary server is operating, and writes said key data to a primary server computer log file when said secondary server computer is not operating and said primary server is operating.

4. The key management system of claim 3 wherein said operating one of said primary and secondary key management computers monitors operating status of said non-operating one of said primary and secondary server computers, and includes means for resynchronizing said archive database of said non-operating server computer when said non-operating server computer becomes operational whereby said archive database of each of said primary and secondary server computers are thereafter synchronized for having subsequent key data written thereto.

5. A method of fault tolerant key management of cryptographic keys, comprising the steps of:

providing primary and secondary key management computers operatively coupled to primary and secondary server computers, requesting storage of key data by an operating one of said primary and secondary key management computers;

monitoring the operating status of each of said primary and secondary server computers;

writing key data to an archive database in each of said primary and secondary server computers that are operating;

writing key data to a log file in an operating one of said primary and secondary server computers when one of said primary and secondary server computers is not operating;

monitoring a return to operating status of said non-operating one of said primary and secondary server computers; and writing to said archive database of said non-operating one of said primary and secondary server computers that has returned to operating status said key data stored in said log file of said operating one of said primary and secondary server computers.

6. A fault tolerant data management system for synchronizing the replication of data comprising:

a data distribution computer;

a primary data management computer operatively coupled to said data distribution computer by a first interface;

a secondary data management computer operatively coupled to said data distribution computer by a second interface, said second interface being parallel to said first interface;

a primary server computer operatively coupled to said primary and secondary data management computers; and a secondary server computer operatively coupled to said primary and secondary data management computers;

wherein one of said primary and secondary data management computers is operating at a time, said operating one of said primary and secondary data management computers including means for writing data received from said data distribution computer to an archive database in each of said primary and secondary server computers.

7. The fault tolerant data management system of claim 6 wherein said operating one of said primary and secondary data management computers includes replication means that verify that said primary and secondary server computers are respectively operating before writing said data to said archive database in each of said primary and secondary server computers.

8. The fault tolerant data management system of claim 7 wherein said operating one of said primary and secondary data management computers writes said data to a secondary server computer log file when said primary server computer is not operating an said secondary server is operating, and writes said data to primary server computer log file when said secondary server computer is not operating and said primary server is operating.

9. The fault tolerant data management system of claim 8 wherein said operating one of said primary and secondary data management computers monitors operating status of said non-operating one of said primary and secondary server computers, and includes means for resynchronizing said archive database of said non-operating server computer when said non-operating server computer becomes operating whereby said archive database of each of said primary and secondary server computers are thereafter synchronized for having subsequent data written thereto.

* * * * *